(12) United States Patent
Kong et al.

(10) Patent No.: US 10,704,521 B2
(45) Date of Patent: *Jul. 7, 2020

(54) PORTABLE GASOLINE TOOL AND ELECTRONIC IGNITION SYSTEM THEREOF

(71) Applicant: SUZHOU CLEVA PRECISION MACHINERY & TECHNOLOGY CO., LTD, Suzhou (CN)

(72) Inventors: Zhao Kong, Jiangsu (CN); Fei Chen, Jiangsu (CN)

(73) Assignee: Suzhou Cleva Precision Machinery & Tchnology Co., Ltd.

( * ) Notice: Subject to any disclaimer, the term of this patent is extended or adjusted under 35 U.S.C. 154(b) by 16 days.

This patent is subject to a terminal disclaimer.

(21) Appl. No.: 16/069,557

(22) PCT Filed: Jan. 13, 2017

(86) PCT No.: PCT/CN2017/071178
§ 371 (c)(1),
(2) Date: Jul. 12, 2018

(87) PCT Pub. No.: WO2017/121398
PCT Pub. Date: Jul. 20, 2017

(65) Prior Publication Data
US 2019/0024620 A1 Jan. 24, 2019

(30) Foreign Application Priority Data
Jan. 15, 2016 (CN) .......................... 2016 1 0024698

(51) Int. Cl.
*F02P 1/00* (2006.01)
*F02P 3/05* (2006.01)
(Continued)

(52) U.S. Cl.
CPC ................ *F02P 3/05* (2013.01); *F02B 63/00* (2013.01); *F02N 11/08* (2013.01);
(Continued)

(58) Field of Classification Search
CPC .. F02P 3/0442; F02P 15/00; F02P 3/02; F02P 3/04; F02P 5/045
(Continued)

(56) References Cited

U.S. PATENT DOCUMENTS 4,502,454 A * 3/1985 Hamai ..................... F02P 3/051
123/406.65
4,702,221 A * 10/1987 Tokura .................. F02P 3/0442
123/606
(Continued)

FOREIGN PATENT DOCUMENTS

CN 1333423 A 1/2002
CN 1793639 A 6/2006
(Continued)

OTHER PUBLICATIONS

International Search Report for International Application No. PCT/CN2017/071178, dated Apr. 10, 2017.
(Continued)

*Primary Examiner* — John Kwon
(74) *Attorney, Agent, or Firm* — JK Intellectual Property Law, PA

(57) ABSTRACT

An electronic ignition system for a portable gasoline tool includes a voltage boosting device, a spark plug connected with an output of the voltage boosting device, a DC power source, and a controller electrically connected with the DC power source and connected with the voltage boosting device. The controller controls an ignition voltage and an ignition advance angle. A related portable gasoline tool includes a body, a cylinder located in the body, a piston
(Continued)

movable to and fro within the cylinder, a crankshaft co-moved with the piston, and a flywheel located on the body and driven by the crankshaft to rotate.

20 Claims, 8 Drawing Sheets

(51) Int. Cl.
  *F02N 11/08* (2006.01)
  *F02P 5/00* (2006.01)
  *F02P 5/15* (2006.01)
  *F02B 63/00* (2006.01)
  *F02P 5/145* (2006.01)
  *F16F 15/30* (2006.01)

(52) U.S. Cl.
  CPC ............ *F02N 11/0862* (2013.01); *F02P 5/00* (2013.01); *F02P 5/145* (2013.01); *F02P 5/1502* (2013.01); *F02N 2011/0881* (2013.01); *F16F 15/30* (2013.01)

(58) Field of Classification Search
  USPC ... 123/406.11, 594, 596, 609, 623, 624, 650
  See application file for complete search history.

(56) References Cited

U.S. PATENT DOCUMENTS

| | | | | |
|---|---|---|---|---|
| 5,694,900 | A | * | 12/1997 | Morita ..................... F02P 17/12 123/406.21 |
| 5,782,210 | A | * | 7/1998 | Venturoli .............. F02P 5/1502 123/406.61 |
| 6,397,817 | B1 | * | 6/2002 | Yoshida ................. F02D 37/02 123/406.47 |
| 7,493,889 | B2 | | 2/2009 | Nickel et al. |
| 7,525,287 | B2 | | 4/2009 | Miyashita et al. |
| 9,049,816 | B2 | | 6/2015 | Ito et al. |
| 10,371,044 | B2 | | 8/2019 | Karrar |
| 2009/0194726 | A1 | | 8/2009 | Aihara et al. |
| 2016/0102648 | A1 | | 4/2016 | Nakayama et al. |
| 2019/0024612 | A1 | | 1/2019 | Kong et al. |
| 2019/0024620 | A1 | | 1/2019 | Kong et al. |

FOREIGN PATENT DOCUMENTS

| | | |
|---|---|---|
| CN | 101126356 A | 2/2008 |
| CN | 101280739 A | 10/2008 |
| CN | 101363380 A | 2/2009 |
| CN | 202047923 U | 11/2011 |
| CN | 102480915 A | 5/2012 |
| CN | 103527686 | 1/2014 |
| CN | 103758671 A | 4/2014 |
| CN | 105247203 A | 1/2016 |
| CN | 105464875 A | 4/2016 |
| CN | 105484876 A | 4/2016 |
| CN | 105484899 A | 4/2016 |
| CN | 105508117 A | 4/2016 |
| CN | 105545562 A | 5/2016 |
| CN | 105673290 A | 6/2016 |
| CN | 205370829 U | 7/2016 |
| CN | 205503286 U | 8/2016 |
| CN | 205638728 U | 10/2016 |
| CN | 205638760 U | 10/2016 |
| CN | 205638761 U | 10/2016 |
| CN | 205638762 U | 10/2016 |
| JP | 2002227753 A | 8/2002 |

OTHER PUBLICATIONS

International Search Report for International Application No. PCT/CN2017/071175, dated Mar. 31, 2017.

* cited by examiner

PORTABLE GASOLINE TOOL AND ELECTRONIC IGNITION SYSTEM THEREOF

CROSS-REFERENCE TO RELATED APPLICATIONS

The present application is a national stage of International Patent Application No. PCT/CN2017/071178 filed on Jan. 13, 2017, which claims priority to Chinese Patent Application No. 201610024698.X, filed on Jan. 15, 2016, all contents of both which are incorporated by reference herein.

TECHNICAL FIELD

The present disclosure relates to a portable gasoline tool and an electronic ignition system thereof.

BACKGROUND

A portable gasoline tool is often used in the area of garden greening, and its electronic ignition system is a key system therein. The electronic ignition system mainly comprises a flywheel, a voltage boosting device, and a spark plug, and mainly functioning to ignite, with a spark produced by the spark plug driven by a high voltage coil, the combustible gas mixture introduced into the combustion chamber, to make it explode to release energy. In addition, the electronic ignition system operates at a most suitable ignition angle and gives out sufficient ignition voltage such that the gasoline engine of the portable gasoline tool can run smoothly and has an improved efficiency. Currently, the commonly used electronic ignition system comprises a magnet motor, an igniter, an inductive coil provided on the cylinder, and a permanent magnet mounted on the flywheel. The permanent magnet is rotated with the flywheel, and every time it meets the inductive coil fixed on the cylinder around a circle, an inductive current is produced in the inductive coil (as in an electric generator in principle). The higher the rotation speed of the flywheel is, the larger the inductive current produced; the lower the rotation speed, the smaller the inductive current. An electric circuit is used to amplify the coil inductive current into a voltage of tens of kV such that the spark plug connected thereto and placed in parallel in the combustion chamber of the gasoline engine, ignites. However, the electronic ignition system has the following defects: the voltage is proportional to the rotation speed, and when the rotation speed is relatively low, the produced inductive current is small and the ignition voltage is relatively low, wherein the relation of the ignition time point, the ignition voltage, and the rotation speed is shown in FIG. 1. Moreover, in the start-up stage, the rotation speed is relatively low, the ignition voltage cannot produce a large spark needed at this time and it is adverse to ignition, resulting in the difficulties to start the gasoline engine for the user to employ.

SUMMARY

Technical Problem(s)

The technical problem to be solved by the present disclosure is to provide a portable gasoline tool and an electronic ignition system thereof wherein the operation is simple and convenient, it can be started even if the rotation speed is relatively low in the start-up stage, enabling an enhanced user experience and facilitating popularization and promotion of the product.

Solutions to the Problem(s)

Technical Solutions

The first technical solution of the present disclosure is: an electronic ignition system for a portable gasoline tool, comprising a voltage boosting device and a spark plug connected with an output of the voltage boosting device; the electronic ignition system for the portable gasoline tool further comprises a DC (direct current) power source and a controller electrically connected with the DC power source and connected with the voltage boosting device, wherein the controller controls ignition voltage and an ignition advance angle.

Based on the first technical solution, the following dependent technical solutions are further included:

The voltage boosting device boosts an output voltage of the DC power source to an ignition voltage; the output voltage of the DC power source is 6 V~12 V, and the ignition voltage is 10 kV~30 kV.

The ignition voltage is 15 kV~30 kV.

The voltage boosting device comprises a plurality of stages of voltage boosting units; an output voltage of the lithium battery is boosted, through the plurality of stages of voltage boosting units, to the ignition voltage.

The voltage boosting device comprises a first-stage voltage boosting unit and a second-stage voltage boosting unit, the first-stage voltage boosting unit boosts the voltage from the output voltage of the lithium battery to 200 V~250 V, and the second-stage voltage boosting unit further boosts the voltage from 200 V~250 V to the ignition voltage.

The portable gasoline tool comprises: a body, and a flywheel provided on the body; the electronic ignition system further comprises: a sensing element provided on the flywheel or the body, and a position sensor provided on the body or the flywheel to obtain a rotation speed of the flywheel through the sensing element; the controller controls the ignition voltage and the ignition advance angle according to the rotation speed of the flywheel.

The sensing element is provided on the flywheel and it is a magnet, with its number being at least one; the position sensor is provided on the body, with its number being one.

The sensing element is provided on the flywheel and it is Fe, with its number being at least one; the position sensor is provided on the body, with its number being one, wherein the position sensor is an approach switch.

The DC power source is a Li battery; the controller is an MCU (microcontroller unit) controller.

The DC power source is removable and rechargeable.

The electronic ignition system further comprises a temperature sensor connected with the controller, the temperature sensor obtains an ambient temperature; the controller can control the ignition voltage and the ignition advance angle according to the ambient temperature.

The voltage boosting device comprises an ignition coil.

The second technical solution of the present disclosure is: a portable gasoline tool, comprising a body, a cylinder provided in the body, a piston movable to and fro in the cylinder, a crankshaft co-moved with the piston, a flywheel provided on the body and driven by the crankshaft to rotate, and the electronic ignition system described above.

Beneficial Effect(s) of the Present Disclosure

Beneficial Effect(s)

In the present disclosure, the controller with an MCU design can precisely control the ignition angle and energy. When the load of the gasoline engine changes rapidly, the controller can, with the change in rotation speed as detected by the position sensor, adjust the ignition angle at the appropriate time, thus making the gasoline engine work more stably. In addition, the operation is simple and convenient, and it can be started even if the rotation speed is relatively low in the start-up stage, thus enabling an enhanced user experience and facilitating popularization and promotion of the product.

DETAILED DESCRIPTION

Figure 1:
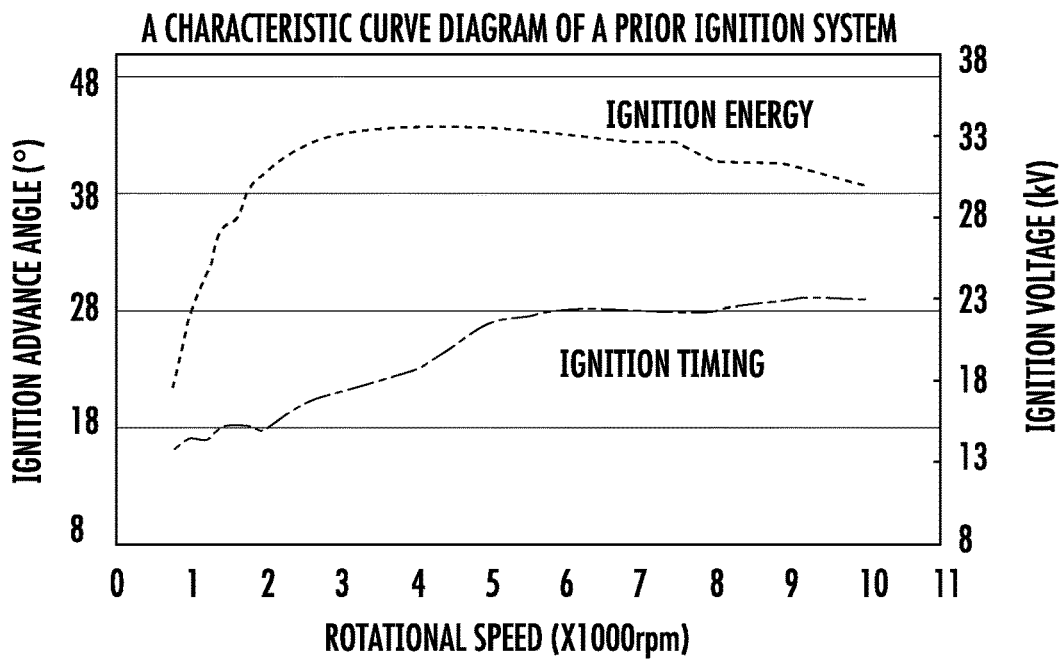
FIG. 1 is a characteristic graph of a traditional ignition system.
Figure 2:
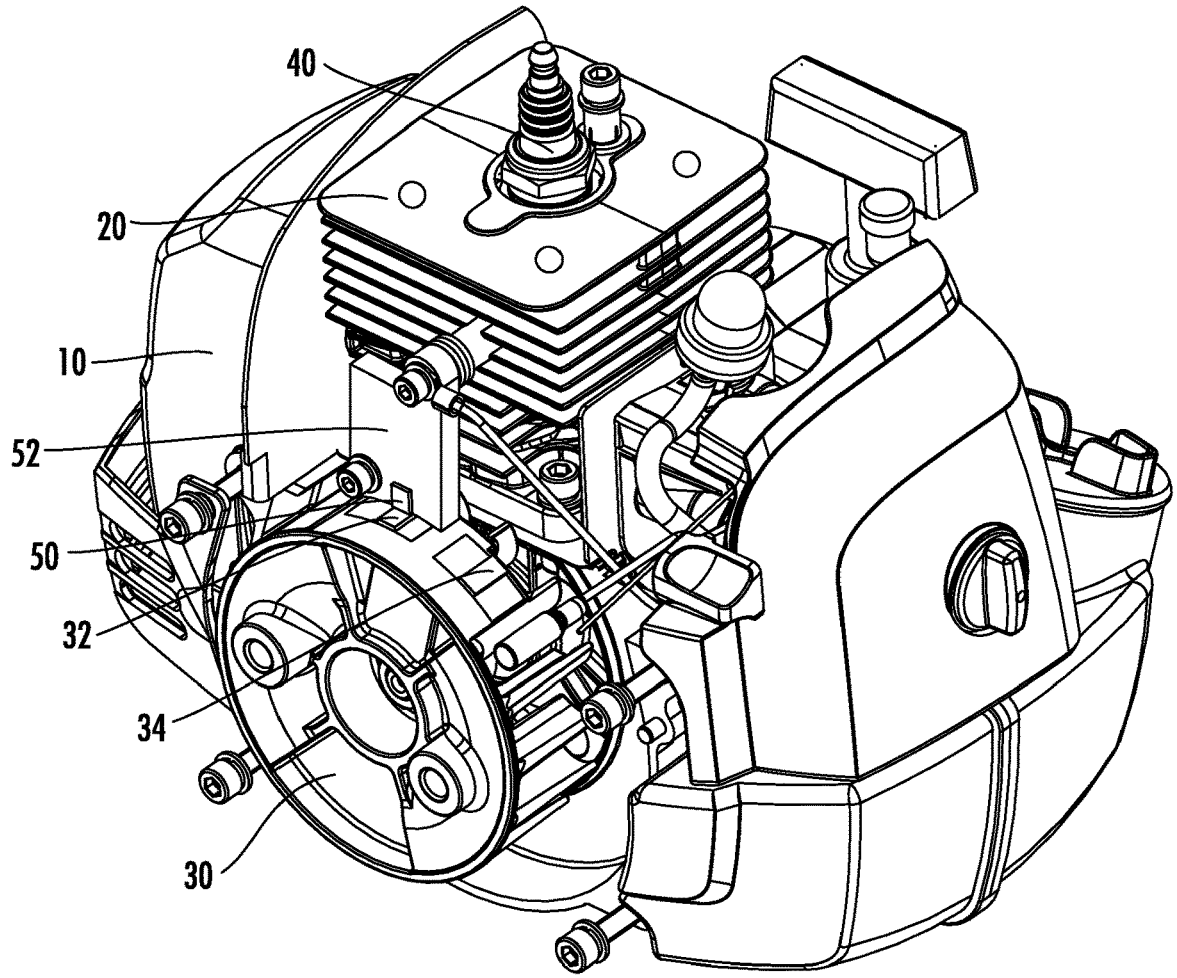
FIG. 2 is an isometric view of one embodiment of a portable gasoline tool according to certain aspects of the present disclosure, with a portion of the housing removed.
Figure 3:
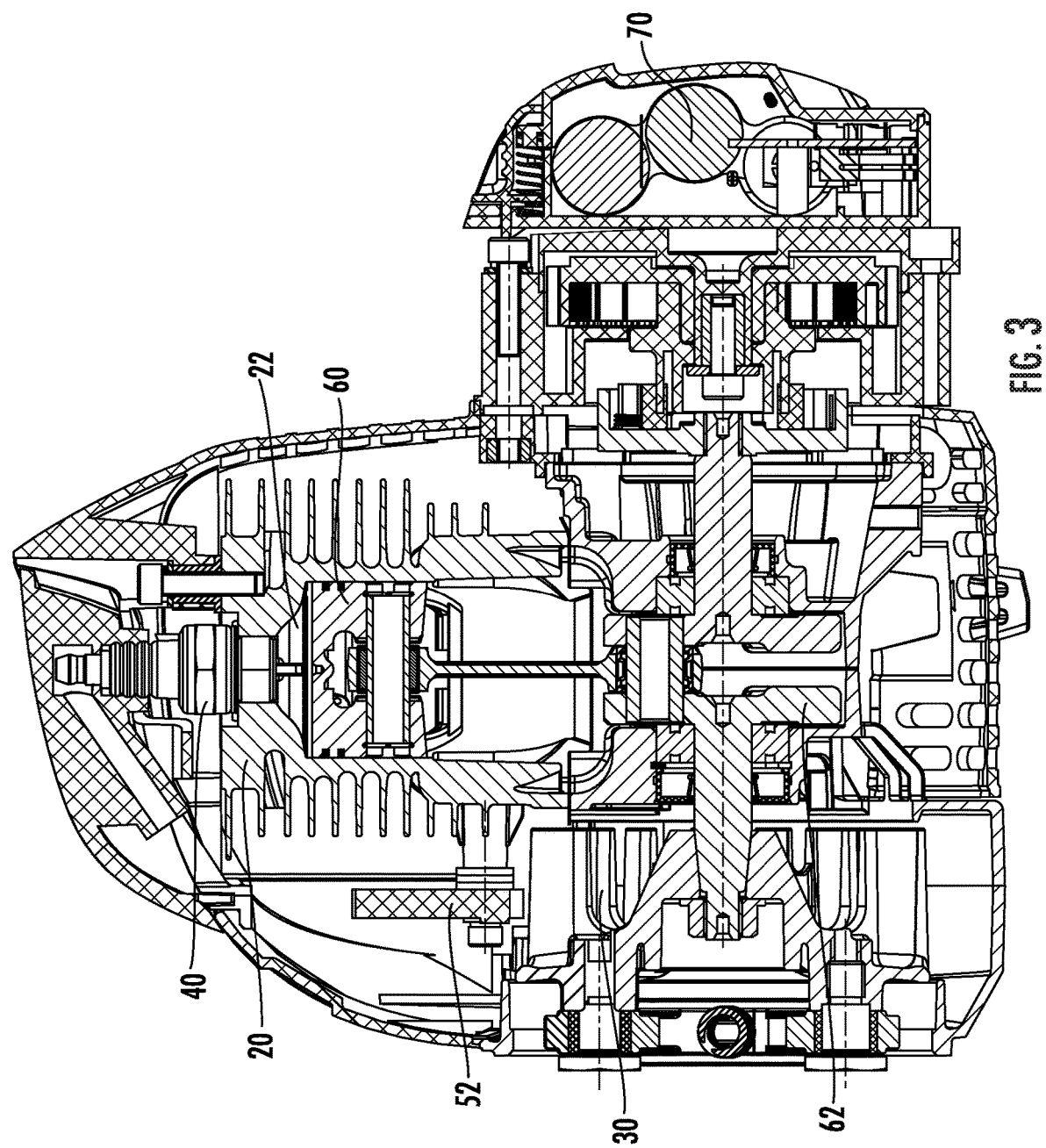
FIG. 3 is a sectional view of the portable gasoline tool of FIG. 2.

As shown in FIGS. 2-3, a first embodiment of an electronic ignition system for a portable gasoline tool is provided, comprising: a voltage boosting device and a spark plug 40 connected with an output of the voltage boosting device. The electronic ignition system for the portable gasoline tool further comprises a DC power source 70 and a controller electrically connected with the DC power source 70 and connected with the voltage boosting device. The DC power source 70 is preferably a Li battery, more preferably a removable rechargeable lithium battery. The controller is an MCU controller, wherein the controller controls ignition voltage and an ignition advance angle.

As shown in FIGS. 2-3, a second embodiment of an electronic ignition system for a portable gasoline tool is provided wherein the portable gasoline tool comprises: a body 10, and a flywheel 30 provided on the body 10 and drawn manually or electrically. The electronic ignition system for the portable gasoline tool comprises a voltage boosting device and a spark plug 40 connected with an output of the voltage boosting device. The electronic ignition system for the portable gasoline tool further comprises: a sensing element provided on the flywheel 30 or the body 10, and a position sensor 50 provided on the body 10 or the flywheel 30 to obtain a rotation speed of the flywheel 30 through the sensing element, and a controller electrically connected with the position sensor 50 and connected with the voltage boosting device, wherein the controller controls ignition voltage and an ignition advance angle. In the present embodiment, the sensing element is provided on the flywheel 30 and it is a magnet, with its number being at least two; and the position sensor 50 is provided on the body 10, with its number being one. The position sensor 50 is preferably a Hall element, or may be a photoelectric element or other elements.

Preferably, the sensing element comprises a positioning magnet 32 for initial positioning, and a measuring magnet 34 for rotation speed measurement, wherein the positioning magnet 32 is also referred as the top dead point positioning magnet.

Preferably, the present embodiment further comprises a PCB (printed circuit board) 52 provided on the body 10 and electrically connected and fixed with the position sensor 50. The sensing element is provided in a circumferential direction of the flywheel 30, and the PCB 52 is located at a side of the flywheel 30 and is kept spaced from the flywheel 30.

Preferably, the sensing element is a magnet, with its number being one, and at least two position sensors are provided.

Preferably, the present embodiment further comprises a DC power source 70 providing electric energy to the controller. The DC power source 70 is preferably a Li battery, more preferably a removable lithium battery.

Preferably, the voltage boosting device boosts an output voltage of the Li battery to an ignition voltage, thus providing sufficient energy to ignite the fuel-gas mixture. The output voltage of the Li battery is 6 V~12 V, and the ignition voltage is 10 kV~30 kV. Preferably, the voltage boosting device comprises a plurality of stages of voltage boosting units. In the present embodiment, the voltage boosting device comprises a first-stage voltage boosting unit and a second-stage voltage boosting unit, the first-stage voltage boosting unit boosts the voltage from the output voltage of the lithium battery to 200 V~250 V, and the second-stage voltage boosting unit further boosts the voltage from 220 V~250 V to the ignition voltage. Specifically in the present embodiment, the output voltage of the lithium battery is 6 V or 7.2 V. The voltage boosting device first boosts the output voltage of the lithium battery to 220 V by a series induction manner, and then boosts the 220 V voltage to the ignition voltage wherein the ignition voltage is 15 kV~30 kV.

Preferably, the voltage boosting device comprises an ignition coil.

As shown in FIGS. 2-3, a third embodiment of a portable gasoline tool is provided, comprising: a body 10, a cylinder 20 provided in the body 10, a piston 60 movable to and fro within the cylinder 20, a crankshaft 62 driving the piston 60 to move, a flywheel 30 provided on the body 10 and driven by the crankshaft 62 to rotate, and an electronic ignition system which comprises a voltage boosting device and a spark plug 40 connected with an output of the voltage boosting device and provided on the cylinder 20. The electronic ignition system further comprises: a sensing element provided on the flywheel 30 or the body 10, a position sensor 50 provided on the body 10 or the flywheel 30 to obtain a rotation speed of the flywheel through the sensing element, and a controller electrically connected with the position sensor 50 and connected with the voltage boosting device. Wherein, the sensing element is preferably provided on the flywheel 30 and it is a magnet, with its number being at least two; and the position sensor 50 is provided on the body 10, with its number being one. The position sensor 50 is preferably a Hall element, or may be a photoelectric element or other elements. The cylinder 20 is provided therein with a combustion chamber 22, wherein the spark plug 40 is fixed on the cylinder 20 and is at least partially extended into the combustion chamber 22.

Preferably, the sensing element comprises a positioning magnet 32 for initial positioning, and a measuring magnet 34 for rotation speed measurement, wherein the positioning magnet 32 is also referred as the top dead point positioning magnet.

Preferably, the present embodiment further comprises a PCB 52 provided on the body 10 and electrically connected and fixed with the position sensor 50. The sensing element is provided in a circumferential direction of the flywheel 30, and the PCB 52 is located at a side of the flywheel 30 and is kept spaced from the flywheel 30.

Preferably, the sensing element is a magnet, with its number being one, and at least two position sensors are provided. The position sensor 50 is preferably a Hall element, or may be a photoelectric element or other elements.

Preferably, the present embodiment further comprises a DC power source 70 providing electric energy to the controller, and a temperature sensor connected with the controller.

As shown in FIGS. 2-3, a fourth embodiment of an electronic ignition system for a portable gasoline tool is provided, comprising: a voltage boosting device and a spark plug 40 connected with an output of the voltage boosting device. The electronic ignition system for the portable gasoline tool further comprises: a DC power source 70, and a controller electrically connected with the DC power source 70 and connected with the voltage boosting device, and a temperature sensor connected with the controller. The DC power source 70 is preferably a Li battery, more preferably a removable lithium battery.

As shown in FIGS. 2-3, a fifth embodiment of an electronic ignition system for a portable gasoline tool is provided wherein the portable gasoline tool comprises: a body 10, and a flywheel 30 provided on the body 10 and drawn manually or electrically. The electronic ignition system for the portable gasoline tool comprises a voltage boosting device and a spark plug 40 connected with an output of the voltage boosting device. The electronic ignition system for the portable gasoline tool further comprises: a sensing element provided on the flywheel 30 or the body 10, a position sensor 50 provided on the body 10 or the flywheel 30 to obtain a rotation speed of the flywheel through the sensing element, a controller electrically connected with the position sensor 50 and connected with the voltage boosting device, a DC power source 70 providing electric energy to the controller, and a temperature sensor connected with the controller. The position sensor 50 is preferably a Hall element, or may be a photoelectric element or other elements. The DC power source 70 is preferably a Li battery, more preferably a removable rechargeable lithium battery.

Figure 4:
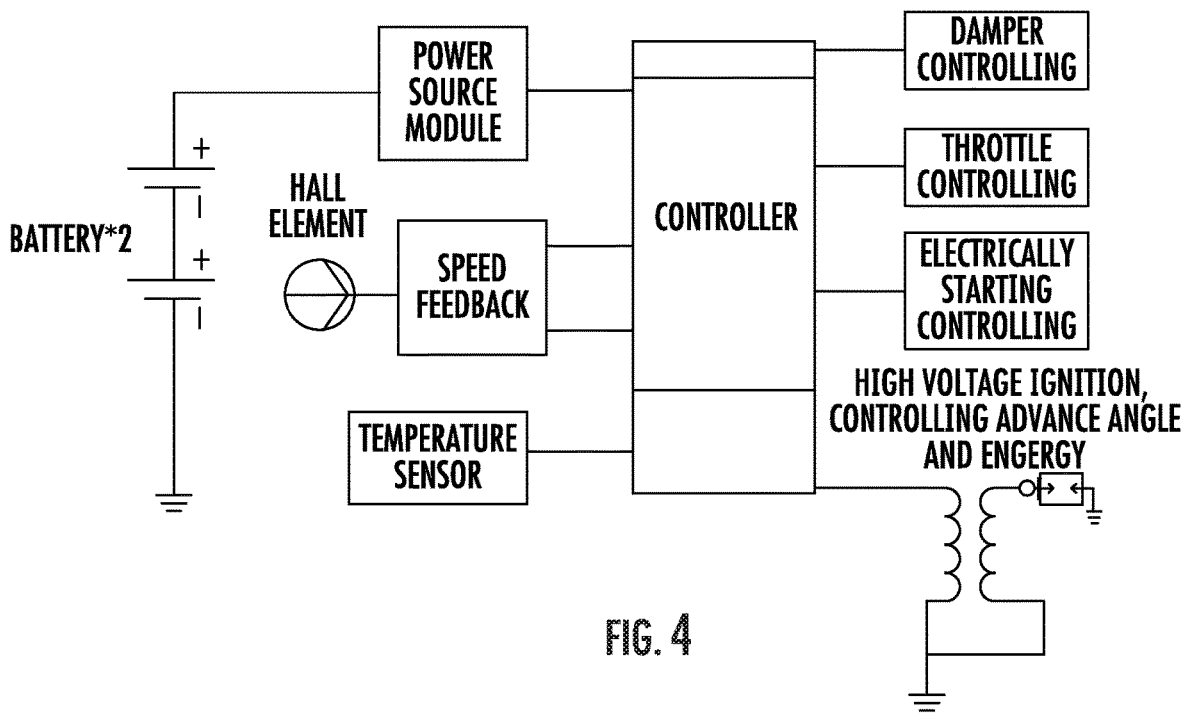
FIG. 4 is an electric circuit function block diagram of a digital ignition system according to the present disclosure.
Figure 6:
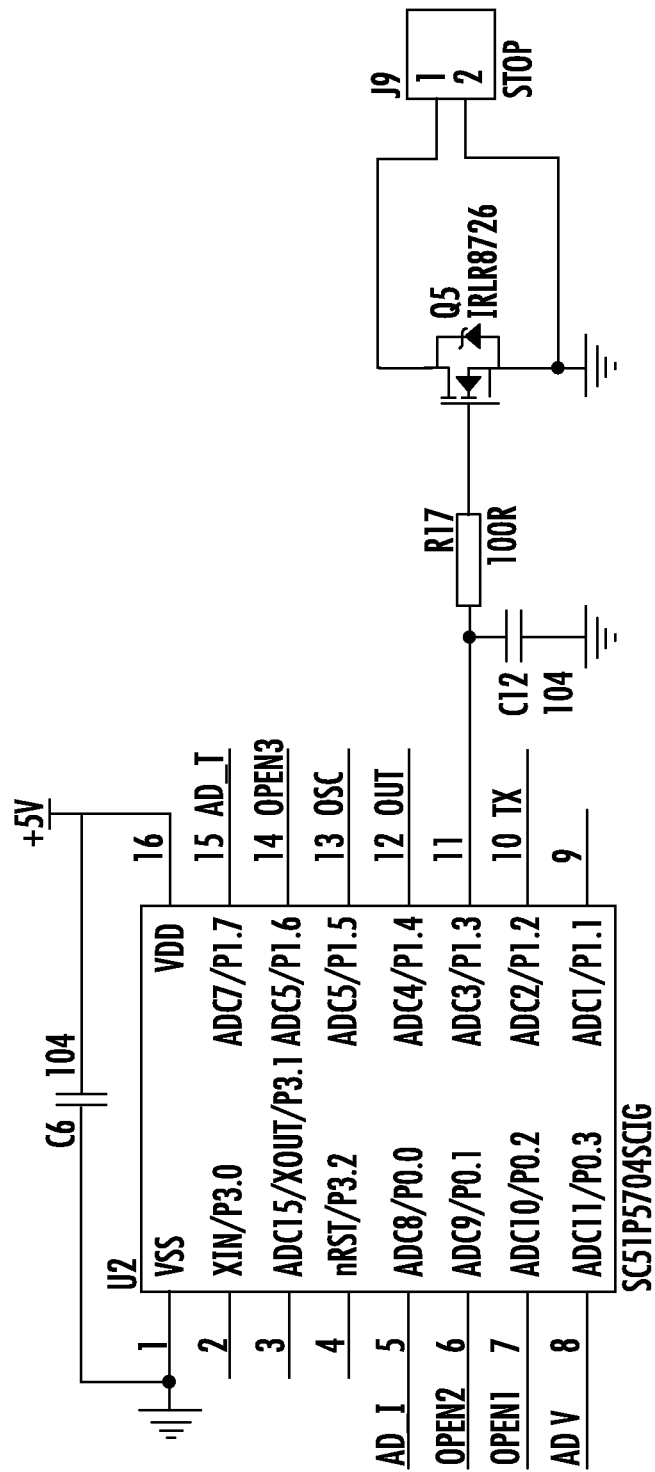
FIG. 6 is an electric circuit diagram of a controller according to the present disclosure.
Figure 7:
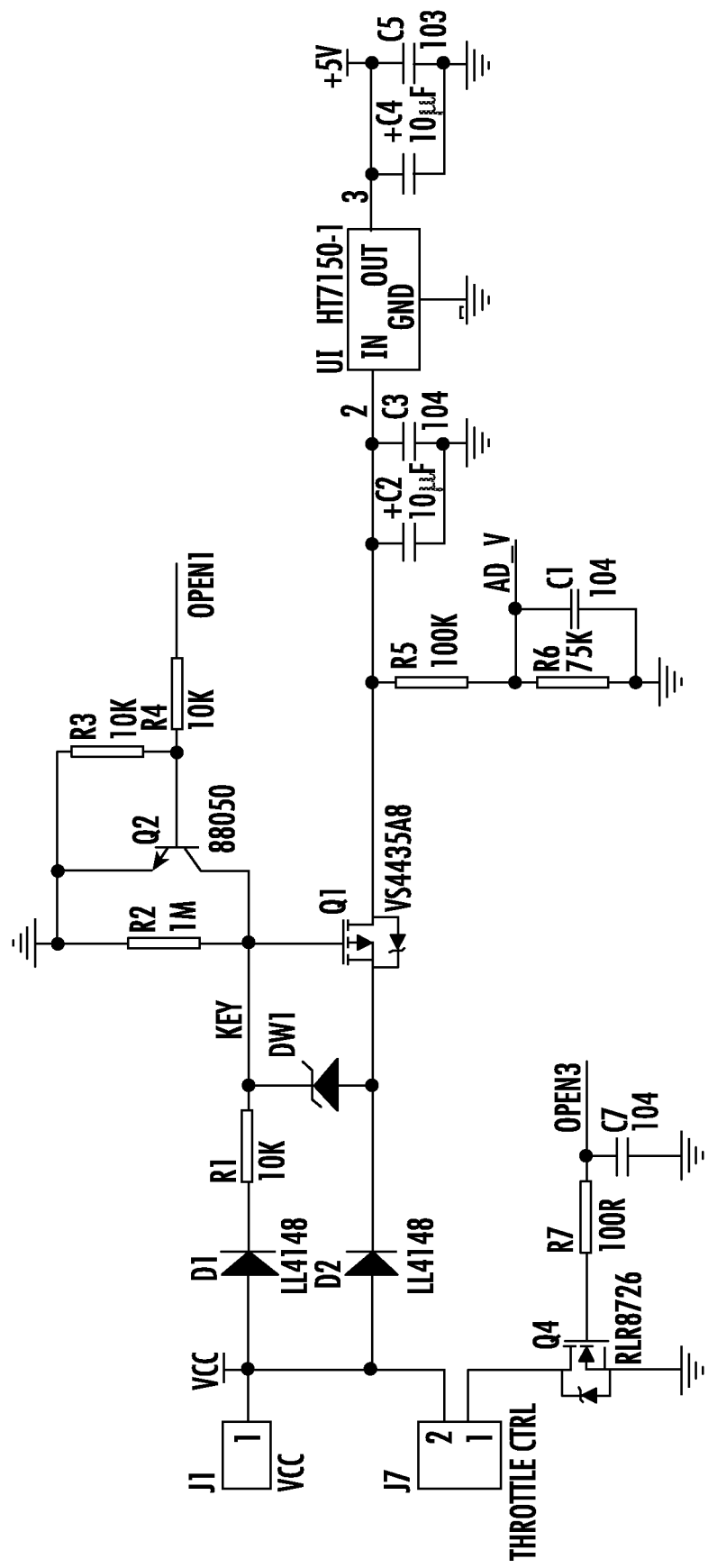
FIG. 7 is an electric circuit diagram of a power source module according to the present disclosure.
Figure 8:
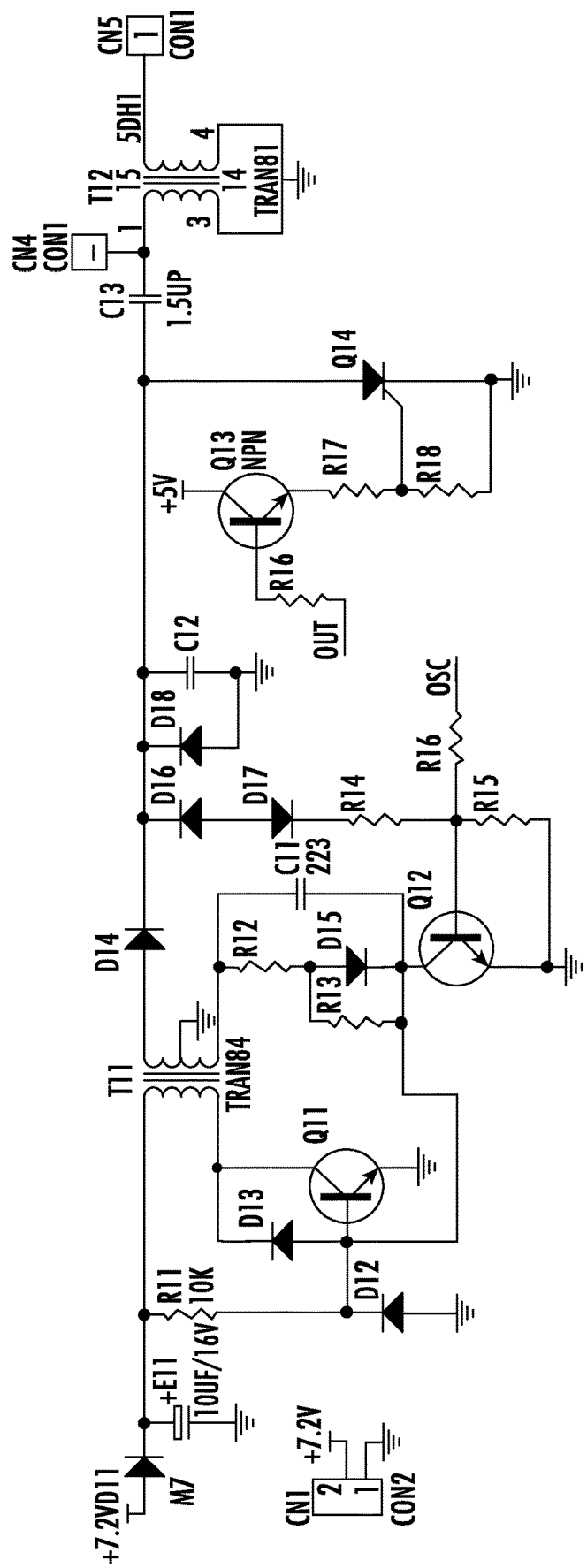
FIG. 8 is an electric circuit diagram of a high voltage ignition mechanism according to the present disclosure.
Figure 9:
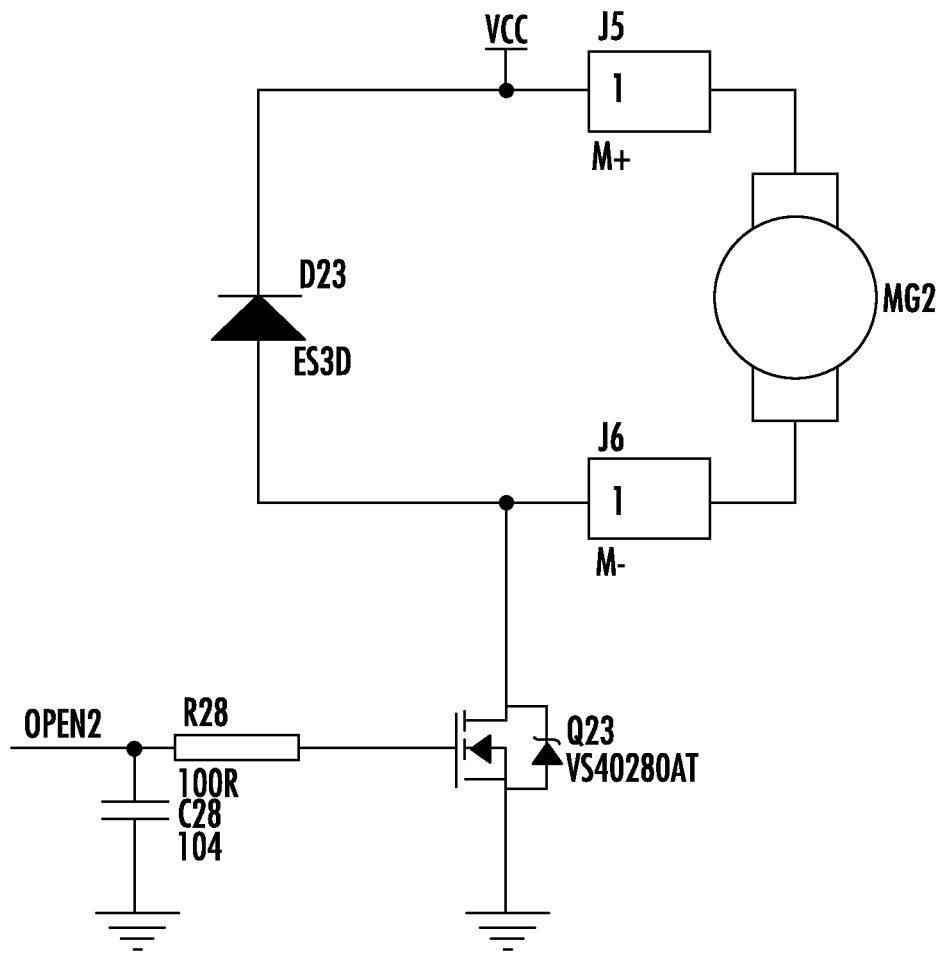
FIG. 9 is an electric circuit diagram of a damper and throttle controlling mechanism according to the present disclosure.
Figure 10:
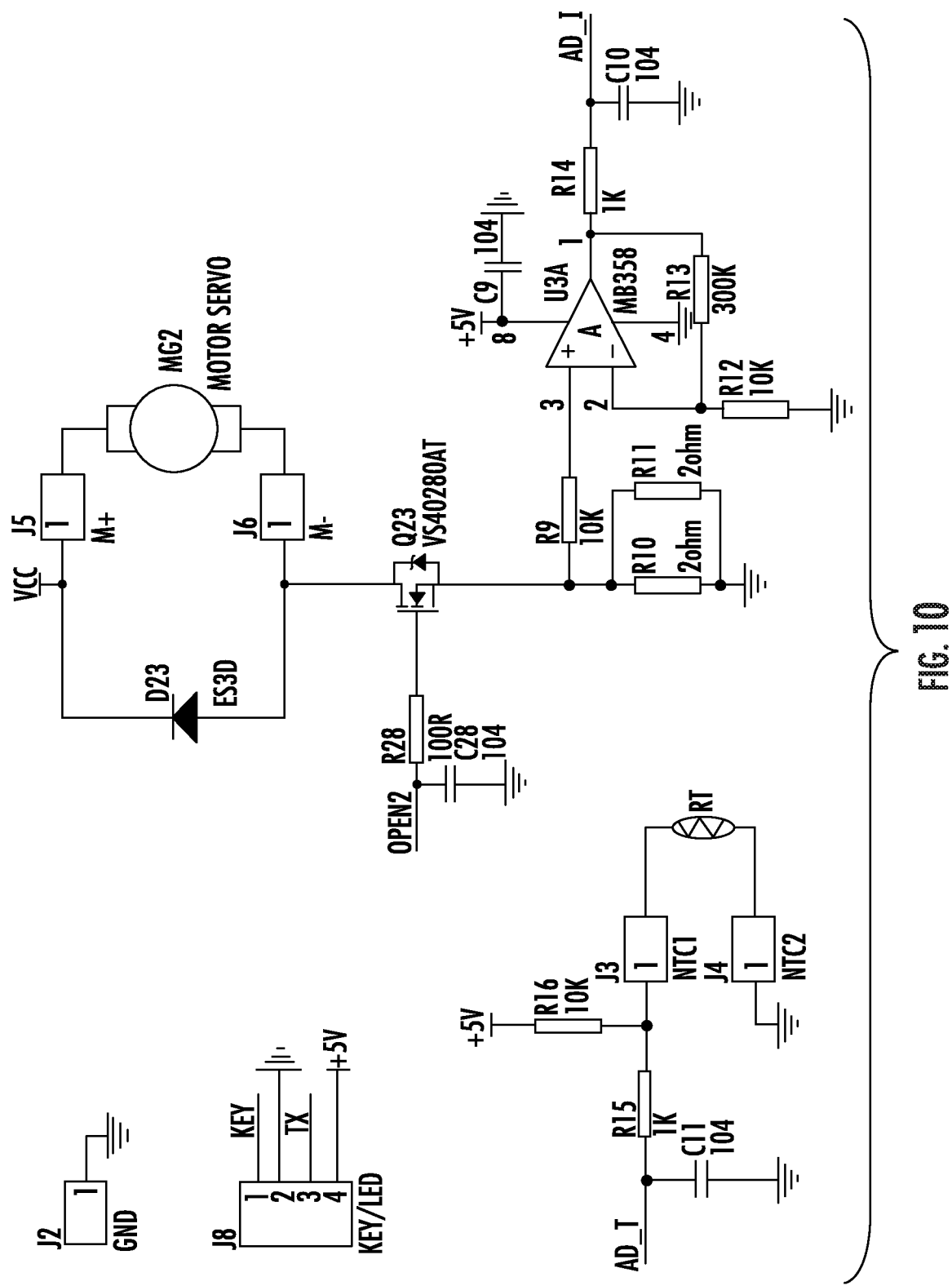
FIG. 10 is an electric circuit diagram of an electrically-starting controlling mechanism according to the present disclosure.

As shown in FIG. 4, an electric circuit function block diagram is provided, and in structure it comprises: a Li battery with its negative electrode connected to the ground, a power source module for voltage reduction connected with a positive electrode of the Li battery, a controller connected with the power source module, a damper controlling mechanism connected with the controller, a throttle controlling mechanism connected with the controller, an electrically-starting controlling mechanism connected with the controller, a high voltage ignition mechanism connected with the controller, a speed feedback mechanism connected with the controller and with a Hall element, and a temperature sensor connected with the controller, wherein the controller is provided therein with a main chip circuit and its electric circuit structure is specifically detailed in FIG. 6, the inside electric circuit of the power source module is specifically detailed in FIG. 7, the electric circuit structure of the high voltage ignition mechanism is specifically detailed in FIG. 8, the electric circuit structure of the damper and throttle controlling mechanism is specifically detailed in FIG. 9, and the electric circuit structure of the electrically-starting controlling mechanism is specifically detailed in FIG. 10. The high voltage ignition mechanism comprises a voltage boosting device, a spark plug, and other element(s).

Figure 5:
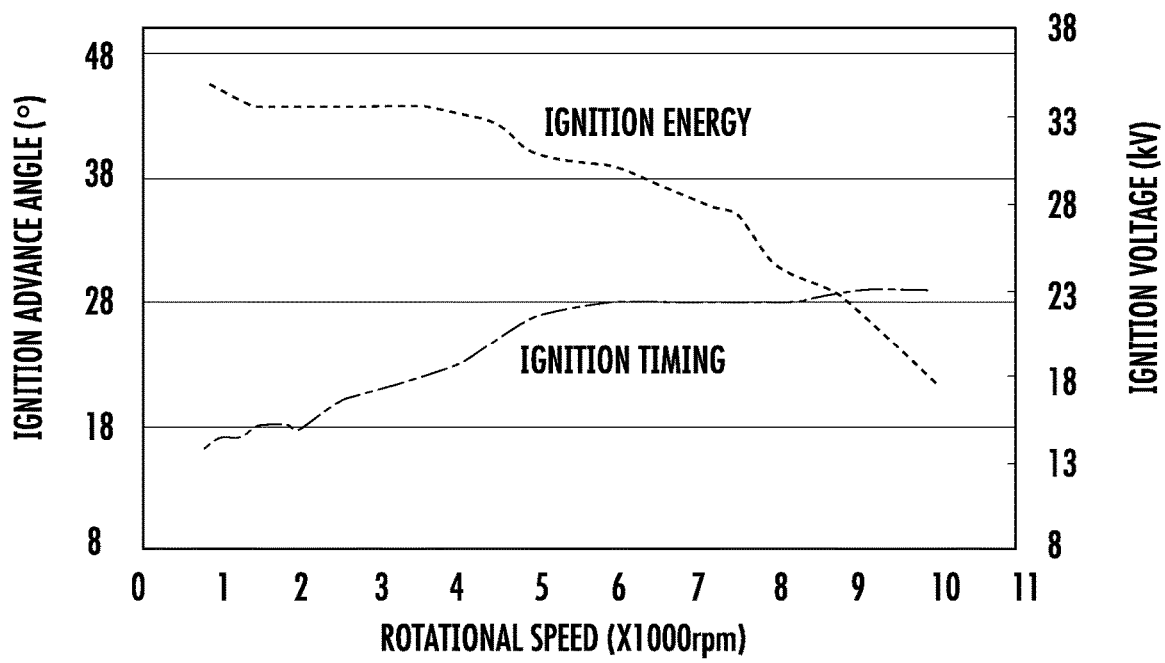
FIG. 5 is a characteristic graph of an ignition system according to the present disclosure.

In summary, the Li battery is used as the DC power source, the position sensor is used to detect the rotation speed of the flywheel to determine the ignition angle, the temperature sensor is used to detect the current temperature, and the controller converts the DC power source from a low voltage to a high voltage via the voltage boosting device. The controller, according to various working conditions including the current rotation speed, working time, temperature, etc., calculates the currently necessary ignition angle and ignition voltage, then the electronic ignition system, with the angle calculated by the controller itself, uses a high voltage pack to release an electric spark with corresponding energy such that the fuel-gas mixture in the cylinder combusts, pushing the piston to move to and fro so that the gasoline engine is in an ideal working state. Therefore, ignition can be achieved at a very low rotation speed. The temperature sensor is used to detect the current temperature and when the temperature is relatively low, the ignition voltage should be increased. Also, the controller can control the ignition angle and energy such that the ignition occurs when the concentration in the cylinder is the highest, producing the largest spark, so that it is relatively easy to start the gasoline engine, easier to operate and higher in efficiency. Compared with the prior technical solution of a magnet motor, it is not necessary to install bulky magnet modules on the blades of the flywheel, and thus the weight of the blades can be reduced, so that the power (from the gasoline engine) consumed by the blades is relatively small and the whole efficiency of the system can be improved. Also, by speed detection, the ignition angles at different speeds can be controlled to be in the ideal state, thus improving the working efficiency of the gasoline engine system in any speed state. Moreover, the controller with an MCU design can precisely control the ignition angle and energy. When the load of the gasoline engine changes rapidly, the controller can, with the flywheel position detected by the position sensor and the flywheel rotation speed and with controlling of the program algorithms, adjust the ignition angle at the appropriate time. Thus a relation of the ignition time point, the ignition voltage, and the rotation speed as obtained is shown in FIG. 5, thereby making the gasoline engine work more stably.

The above embodiments are provided only to explain the technical concepts and features of the present disclosure, with the purpose for enabling those skilled in the art to implement the embodiments of the present disclosure by understanding the contents thereof, rather than limiting the protection scope of the embodiments of the present disclosure thereto. Any equivalent alternative or modification made to the main technical solutions of the embodiments of the present disclosure based on the substantial spirit of the embodiments of the present disclosure will fall within the protection scope of the embodiments of the present disclosure.

What is claimed is:

1. An electronic ignition system for a portable gasoline tool, comprising:
   a voltage boosting device;
   a spark plug connected with an output of the voltage boosting device;
   a DC power source; and
   a controller electrically connected with the DC power source and connected with the voltage boosting device, wherein the controller controls an ignition voltage and an ignition advance angle.

2. The electronic ignition system according to claim 1, wherein the voltage boosting device boosts an output voltage of the DC power source to the ignition voltage, the output voltage of the DC power source is 6V~12V, and the ignition voltage is 10 kV~30 kV.

3. The electronic ignition system according to claim 2, wherein the ignition voltage is 15 kV~30 kV.

4. The electronic ignition system according to claim 1, wherein the DC power source includes a lithium battery, the voltage boosting device includes a plurality of stages of voltage boosting units, and an output voltage of the lithium battery is boosted to the ignition voltage through the plurality of stages of voltage boosting units.

5. The electronic ignition system according to claim 4, wherein the plurality of stages of voltages boosting units includes a first-stage voltage boosting unit and a second-stage voltage boosting unit, the first-stage voltage boosting unit boosts a voltage from the output voltage of the lithium battery to 200V~250V, and the second-stage voltage boosting unit further boosts the voltage from 200V~250V to the ignition voltage.

6. The electronic ignition system according to claim 1, wherein the portable gasoline tool includes a body, and a flywheel provided on the body; and
   the electronic ignition system further comprising at least one sensing element provided on one of the flywheel and the body, and at least one position sensor provided on the other one of the body and the flywheel to obtain a rotation speed of the flywheel through the at least one sensing element, wherein the controller controls the ignition voltage and the ignition advance angle according to the rotation speed of the flywheel.

7. The electronic ignition system according to claim 1, further comprising a temperature sensor connected with the controller, wherein the temperature sensor obtains an ambient temperature, and the controller controls the ignition voltage and the ignition advance angle according to the ambient temperature.

8. The electronic ignition system according to claim 5, wherein the second-stage voltage boosting unit is an ignition coil.

9. A portable gasoline tool, comprising:
   a body;
   a cylinder located in the body;
   a piston movable to and fro within the cylinder;
   a crankshaft co-moved with the piston;
   a flywheel located on the body and driven by the crankshaft to rotate; and
   an electronic ignition system including a voltage boosting device, a spark plug connected with an output of the voltage boosting device, a DC power source, and a controller electrically connected with the DC power source and connected with the voltage boosting device, wherein the controller controls an ignition voltage and an ignition advance angle.

10. The portable gasoline tool according to claim 9, wherein the electronic ignition system further includes at least one sensing element located on one of the flywheel and the body, and at least one position sensor provided on the other one of the body and the flywheel to obtain a rotation speed of the flywheel via the at least one sensing element.

11. The portable gasoline tool according to claim 9, wherein the electronic ignition system further includes a temperature sensor connected with the controller, the temperature sensor obtains an ambient temperature, and the controller controls the ignition voltage and the ignition advance angle according to the ambient temperature.

12. The electronic ignition system according to claim 6, wherein the at least one sensing element is located on the flywheel and is a magnet, and the at least one sensing element includes at least two sensing elements.

13. The electronic ignition system according to claim 12, wherein the at least one sensing element includes a positioning magnet for initial positioning and a measuring magnet for rotation speed measurement.

14. The electronic ignition system according to claim 6, wherein the at least one position sensor is located on the body, and the at least one position sensor includes only one position sensor.

15. The electronic ignition system according to claim 6, wherein the at least one position sensor is one of Hall element and a photoelectric element.

16. The electronic ignition system according to claim 6, wherein the at least one sensing element is a magnet, the at least one sensing element includes only one sensing element, and the at least one position sensor includes at least two position sensors.

17. The electronic ignition system according to claim 6, further comprising a PCB located on the body and electrically connected and fixed with the at least one position sensor.

18. The electronic ignition system according to claim 17, wherein the at least one sensing element is located in a circumferential direction of the flywheel, and wherein the PCB is located at a side of and spaced from the flywheel.

19. The electronic ignition system according to claim 1, wherein the controller is an MCU controller.

20. The electronic ignition system according to claim 19, wherein the DC power source is a removable rechargeable lithium battery.

* * * * *